(12) United States Patent
Nishikawa

(10) Patent No.: US 11,240,133 B2
(45) Date of Patent: Feb. 1, 2022

(54) COMMUNICATION QUALITY EVALUATION DEVICE, COMMUNICATION QUALITY EVALUATION METHOD, AND COMMUNICATION QUALITY EVALUATION PROGRAM

(71) Applicant: NEC CORPORATION, Tokyo (JP)

(72) Inventor: Yoshiaki Nishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 21 days.

(21) Appl. No.: 16/629,834

(22) PCT Filed: Jul. 11, 2018

(86) PCT No.: PCT/JP2018/026174
§ 371 (c)(1),
(2) Date: Jan. 9, 2020

(87) PCT Pub. No.: WO2019/013248
PCT Pub. Date: Jan. 17, 2019

(65) Prior Publication Data
US 2021/0092031 A1 Mar. 25, 2021

(30) Foreign Application Priority Data
Jul. 14, 2017 (JP) .............................. JP2017-138361

(51) Int. Cl.
*H04L 12/26* (2006.01)
(52) U.S. Cl.
CPC ................... *H04L 43/08* (2013.01)
(58) Field of Classification Search
CPC ...................................................... H04L 43/08
(Continued)

(56) References Cited

U.S. PATENT DOCUMENTS

2005/0083840 A1* 4/2005 Wilson .................... H04L 47/24
370/230
2011/0295649 A1* 12/2011 Fine .................... G06Q 30/0201
705/7.29
(Continued)

FOREIGN PATENT DOCUMENTS

JP 2002-334200 A 11/2002
JP 2004-078463 A 3/2004
(Continued)

OTHER PUBLICATIONS

"Context-Aware QoE Modelling, Measurement, and Prediction in Mobile Computing Systems", Mitra et al., IEEE Transactions on Mobile Computing vol. 14 No. 5 May 2015. (Year: 2015).*

(Continued)

*Primary Examiner* — Tonia L Dollinger
*Assistant Examiner* — Jonathan A Sparks
(74) *Attorney, Agent, or Firm* — Sughrue Mion, PLLC

(57) ABSTRACT

A communication quality evaluation device includes: a storage unit configured to store permission relationship information indicating a relationship between a plurality of first objective indicators indicating communication quality, and use continuation possibility information indicating whether a user will continue use in the case of each of the first objective indicators; an indicator acquisition unit configured to acquire a second objective indicator at a point in time at which the communication quality evaluation device makes a determination; and a permission determination unit configured to determine, using the second objective indicator acquired by the indicator acquisition unit and with reference to the permission relationship information stored in the storage unit, whether the user will continue use on the basis of the result of the referencing.

10 Claims, 7 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 2014/0379891 A1* | 12/2014 | Arvidsson | .......... | G06Q 30/0201 |
| | | | | 709/224 |
| 2015/0248680 A1* | 9/2015 | Chen | .................. | G06Q 30/0202 |
| | | | | 705/7.31 |
| 2015/0371163 A1* | 12/2015 | Noh | .................... | G06Q 10/0635 |
| | | | | 705/7.28 |
| 2016/0155076 A1* | 6/2016 | Fix | .................... | G06Q 10/06395 |
| | | | | 705/7.39 |
| 2016/0344606 A1* | 11/2016 | Baccarani | ............ | H04L 41/5003 |
| 2017/0220933 A1* | 8/2017 | Gonguet | ................ | G06Q 50/01 |

FOREIGN PATENT DOCUMENTS

| | | |
|---|---|---|
| JP | 2009-080577 A | 4/2009 |
| JP | 2015-041986 A | 3/2015 |
| JP | 2015-106220 A | 6/2015 |
| WO | 2016/017086 A1 | 2/2016 |

OTHER PUBLICATIONS

International Search Report for PCT/JP2018/026174, dated Sep. 18, 2018.

\* cited by examiner

| OBJECTIVE INDICATOR | USE CONTINUATION POSSIBILITY INFORMATION |
|---|---|
| A1 | DOES NOT CONTINUE USE |
| A2 | DOES NOT CONTINUE USE |
| A3 | DOES NOT CONTINUE USE |
| A4 | DOES NOT CONTINUE USE |
| A5 | CONTINUES USE |
| A6 | CONTINUES USE |
| A7 | CONTINUES USE |
| A8 | DOES NOT CONTINUE USE |

| OBJECTIVE INDICATOR | USE CONTINUATION POSSIBILITY INFORMATION |
|---|---|
| 100Kbps | DOES NOT CONTINUE USE |
| 200Kbps | DOES NOT CONTINUE USE |
| 300Kbps | DOES NOT CONTINUE USE |
| 400Kbps | DOES NOT CONTINUE USE |
| 500Kbps | CONTINUES USE |
| 600Kbps | CONTINUES USE |
| 700Kbps | CONTINUES USE |
| 800Kbps | CONTINUES USE |
| 900Kbps | CONTINUES USE |

COMMUNICATION QUALITY EVALUATION DEVICE, COMMUNICATION QUALITY EVALUATION METHOD, AND COMMUNICATION QUALITY EVALUATION PROGRAM

CROSS REFERENCE TO RELATED APPLICATIONS

This application is a National Stage of International Application No. PCT/JP2018/026174 filed Jul. 11, 2018, claiming priority based on Japanese Patent Application No. 2017-138361 filed Jul. 14, 2017, the content of which is incorporated herein by reference.

TECHNICAL FIELD

The present invention relates to a communication quality evaluation device, a communication quality evaluation method, and a communication quality evaluation program.

BACKGROUND ART

In recent years, services using communication networks have been utilized. In a service using such a communication network, communication quality is important for the user.

For example, in an IP (Internet Protocol) telephone, which is a telephone service using the Internet network, the voice quality may change depending on the position of the user holding the portable terminal. For this reason, the technique described in Patent Document 1 proposes acquiring an indicator representing communication quality on the basis of a signal received from a base station before a user makes a call using an IP phone, and displaying an indicator of voice quality that corresponds to the acquired indicator on the display unit of the portable terminal. Thus, according to the technique disclosed in Patent Document 1, before the user makes a call using the IP phone, the user can ascertain whether the voice quality would be good or bad when the call is made using the IP phone at the location of the user just by looking at the screen display.

In addition, there has been a demand for ascertaining the communication quality perceived by the user when communication is actually performed using a communication network (experienced communication quality). For a provider providing a communication service, ascertaining such an experienced communication quality may lead to an efficient operation in infrastructure development or the like in mobile communication.

For this reason, for example, the technique described in Patent Document 2 proposes estimating the experienced communication quality for each user by adding the analysis result relating to a log or the like for each user and each terminal model to the communication quality information in each area.

A service using such a communication network is often provided with a usage fee. For this reason, even if a user contracts with a provider providing a communication network, if the communication quality is low, the user may cancel the contract and switch to a contract with another communication provider. For this reason, it is important for a provider that provides a communication network that the user continues to use the communication network.

CITATION LIST

Patent Literature

[Patent Document 1]
Japanese Unexamined Patent Application, First Publication No. 2015-41986
[Patent Document 2]
Japanese Unexamined Patent Application, First Publication No. 2015-106220

SUMMARY OF INVENTION

Problem to be Solved by the Invention

However, in the technique disclosed in Patent Document 1, even if the user can know the indicator of voice quality before making an IP phone call, the operator could not estimate and ascertain the experienced communication quality with respect to the voice quality when a call is actually made. For this reason, the technique described in Patent Document 1 has the problem of not being able to determine whether a user will continue a contract for use.

Also, the technique disclosed in Patent Document 2 has the problem of, even if the experienced communication quality for each user can be estimated, not being able to determine whether a user will continue a contract for use.

An object of the present invention is to provide a communication quality evaluation device, a communication quality evaluation method, and a communication quality evaluation program that can solve the above-described problems.

Means for Solving the Problem

In order to achieve the abovementioned object, a communication quality evaluation device according to one aspect of the present invention is provided with: a storage unit configured to store permission relationship information indicating a relationship between a plurality of first objective indicators indicating communication quality, and use continuation possibility information indicating whether a user will continue use in the case of each of the first objective indicators; an indicator acquisition unit configured to acquire a second objective indicator at a point in time at which the communication quality evaluation device makes a determination; and a permission determination unit configured to determine, using the second objective indicator acquired by the indicator acquisition unit and with reference to the permission relationship information stored in the storage unit, whether the user will continue use on the basis of the result of the referencing.

According to another aspect of the present invention, a communication quality evaluation method wherein a communication quality evaluation device comprises a storage unit. The communication quality evaluation method includes acquiring permission relationship information indicating a relationship between a plurality of first objective indicators indicating communication quality, and use continuation possibility information indicating whether a user will continue use in the case of each of the first objective indicators so as to store the acquired permission relationship information in a storage unit; acquiring a second objective indicator at a point in time at which a communication quality evaluation device makes a determination; and, using the acquired second objective indicator and with reference to the permission relationship information stored in the storage unit, determining whether the user will continue use on the basis of the result of the referencing.

According to another aspect of the present invention, a communication quality evaluation program causes a computer of a communication quality evaluation device to execute a process of acquiring permission relationship information indicating a relationship between a plurality of first objective indicators indicating communication quality, and use continuation possibility information indicating whether a user will continue use in the case of each of the first objective indicators; acquiring a second objective indicator at a point in time at which a communication quality evaluation device makes a determination; and, using the acquired second objective indicator and with reference to the permission relationship information stored in the storage unit, determining whether the user will continue use on the basis of the result of the referencing.

Advantageous Effects of Invention

According to the present invention, it is possible to provide a communication quality evaluation device, a communication quality evaluation method, and a communication quality evaluation program capable of determining whether a user will continue a contract for use.

DESCRIPTION OF EMBODIMENTS

Hereinbelow, a communication quality evaluation device, a communication quality evaluation method, and a communication quality evaluation program according to an embodiment of the present invention will be described with reference to the drawings.

First Embodiment

Figure 1:
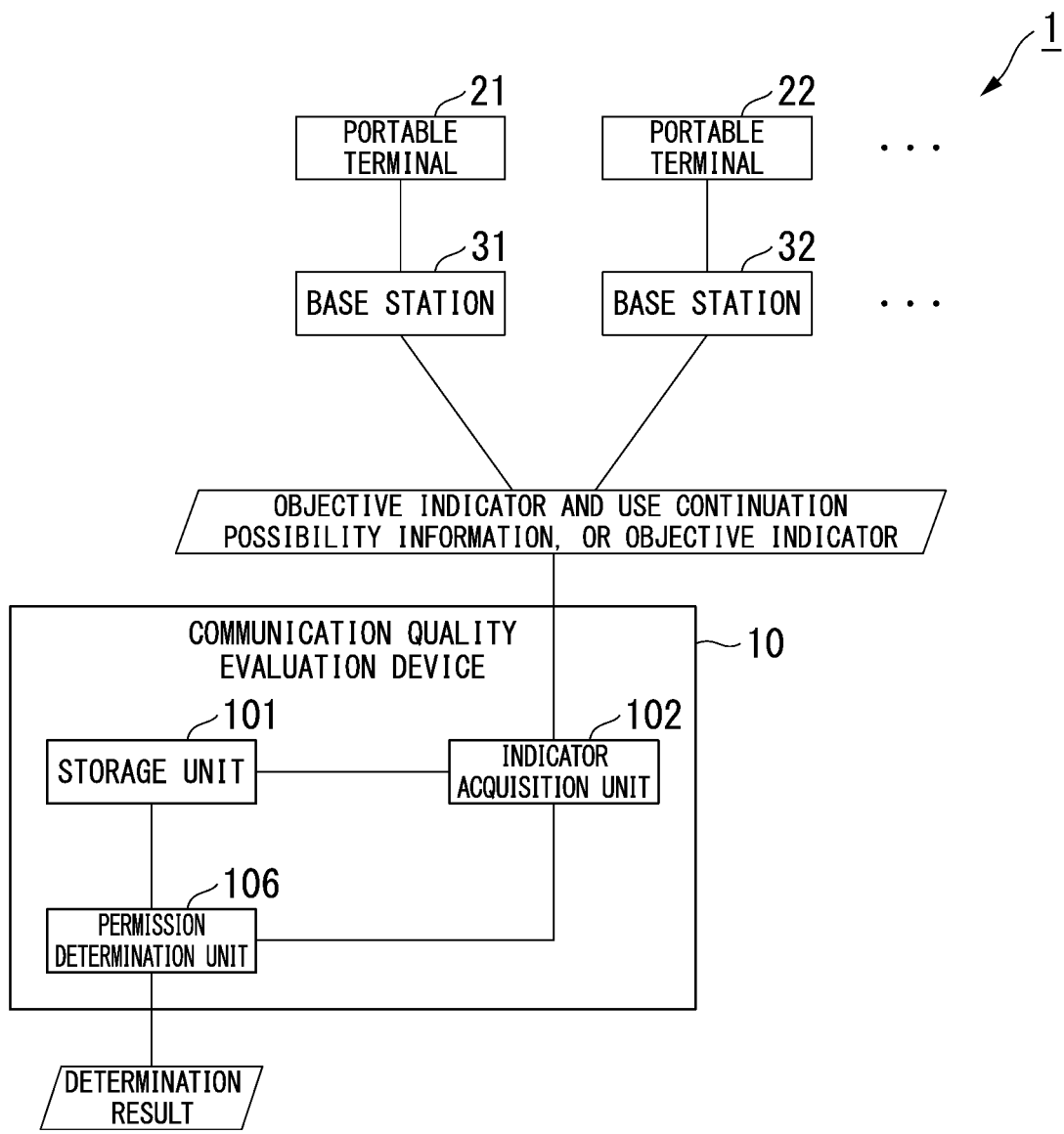
FIG. 1 is a block diagram that shows a configuration example of a communication system containing the communication quality evaluation device according to the first embodiment.

FIG. 1 is a block diagram illustrating a configuration example of a communication system 1 including a communication quality evaluation device 10 according to the present embodiment. As illustrated in FIG. 1, the communication system 1 is constituted by a portable terminal 21, 22, . . . , a base station 31, 32, . . . , and a communication quality evaluation device 10. Note that when each of the portable terminals 21, 22, . . . is not specified, they may representatively be referred to as a portable terminal 20. When each of the base stations 31, 32, . . . is not specified, they may representatively be referred to as a base station 30.

The communication quality evaluation device 10 is provided with a storage unit 101, an indicator acquisition unit 102, and a permission determination unit 106.

The portable terminal 20 is a terminal having a communication function and a display unit such as, for example, a smartphone, a tablet terminal, a notebook computer, a PC (personal computer), and a portable game device. The portable terminal 20 performs desired communication such as browsing web (World Wide Web) pages, playing a song, playing a video, and sending/receiving e-mail via the base station 30.

The base station 30 is an outdoor base station, an indoor relay station, an indoor base station, or the like. In response to a request from the portable terminal 20, the base station 30 performs desired communication such as browsing a web page, playing a song, playing a video, and sending/receiving e-mail. Then, the base station 30 acquires an objective indicator during the desired communication and information indicating whether the user continues use in the case of that objective indicator (use continuation possibility information, subjective information). Here, the objective indicator is an indicator that does not depend on human subjectivity, and is an indicator that can be acquired from communication logs such as delay time, throughput, and packet loss rate. On the other hand, the use continuation possibility information is information depending on human subjectivity. The base station 30 transmits the acquired objective indicator and use continuation possibility information to the communication quality evaluation device 10 via, for example, a network. Note that the objective indicator includes information for identifying the user of the portable terminal 20. The information for identifying the user of the portable terminal 20 is, for example, unique information of the portable terminal 20 or an ID number for identifying a subscriber recorded on a SIM (Subscriber Identity Module) card mounted in the portable terminal 20.

The following are examples of objective indicators and use continuation possibility information. When the user has selected "continue use" when using the communication service, "continue use" is set as the use continuation possibility information, and the throughput at that time is set as an objective indicator. Alternatively, when the user has selected "will not continue use" when using the communication service, "will not continue use" is set as the use continuation possibility information, and the throughput at that time is used as an objective indicator.

The portable terminal 20 performs transmission of the use continuation possibility information when, for example, music is being played back, a movie is being played back, a web page is being displayed, an e-mail is being received, or the like. The base station 30, upon receiving the use continuation possibility information, transmits the received throughput as an objective indicator together with the use continuation possibility information.

The use continuation possibility information is information of a period during which a plurality of objective indicators are acquired. The plurality of objective indicators may be time-series data of a plurality of throughputs in a predetermined period including the time at which the use continuation possibility information was received, in the case of the objective indicators being throughputs when the use continuation possibility information was received. Alternatively, the plurality of objective indicators may be time-series data of a plurality of throughputs in a predetermined period including the time at which the use continuation possibility information was received, and statistical values such as average values and deviations thereof.

The plurality of objective indicators may also be a combination of different types of objective indicators such as throughput and delay time when the use continuation possibility information was received. Further, the plurality of objective indicators may also be time-series data such as a plurality of throughputs and delay times in a predetermined period including the time at which the use continuation possibility information was received. In addition, the plurality of objective indicators may be a plurality of time-series data such as a plurality of throughputs and delay times in a predetermined period including the time at which the use continuation possibility information was received, and statistical values such as average values or a deviations thereof. Note that throughput and delay time are merely examples of objective indicators, and other indicators may be used.

When the user is using a communication service with the portable terminal 20, the base station 30 acquires the current objective indicator at a predetermined time of a timing different from when the use continuation possibility information is acquired, or an arbitrary timing. The base station 30 transmits the acquired objective indicator to the communication quality evaluation device 10 via, for example, a network. The base station 30 may acquire the objective indicator at a timing requested from the communication quality evaluation device 10. The predetermined time is, for example, a time in a time period in which the communication speed generally slows down.

The storage unit 101 stores permission relationship information. The permission relationship information is information indicating a relationship between a plurality of objective indicators and use continuation possibility information, which is information indicating whether the user continues use for each of the objective indicators.

The indicator acquisition unit 102 acquires the objective indicator and the use continuation possibility information transmitted from the base station 30. In addition, when the user is using the communication service on a portable terminal, the indicator acquisition unit 102 may transmit via the base station 30 at a predetermined time or arbitrary timing an instruction to perform a questionnaire "whether or not use would be continued in this communication state" to the portable terminal 20 and acquire the objective indicator and use continuation possibility information. A predetermined time is, for example, a time in a time period at which the communication speed is generally slow. The indicator acquisition unit 102 causes the storage unit 101 to store the acquired objective indicator and use continuation possibility information. The permission relationship information is acquired before the point in time when the permission determination unit 106 makes a determination.

Also, the indicator acquisition unit 102 acquires the objective indicator transmitted from the base station 30 and outputs the acquired objective indicator to the permission determination unit 106.

The permission determination unit 106 acquires the objective indicator output by the indicator acquisition unit 102 and, using the acquired objective indicator, refers to the permission relationship information stored by the storage unit 101. The permission determination unit 106 determines whether or not the user continues use on the basis of the result of the referencing, and outputs the determination result to, for example, a display device, a printing device, or an external device.

Here, an example of an objective indicator will be described.

In the case of wireless communication such as LTE (Long Term Evolution), the objective indicator also includes radio wave quality information such as RSRP (Reference Signal Received Power), which indicates signal strength. Various values such as the time from selection to display of a web page link, video bit rate, resolution, stall number (playback stoppage independent of user operation), and stall time may be included in the objective indicators in the application used by the portable terminal 20. Alternatively, estimated values of these various values, and results calculated using these various values and estimated values of the various values may be included in the objective indicators. The objective indicator may be, for example, a QoE (Quality of Experience) representing the quality of the user experience, calculated from these various values. The objective indicator may also be the throughput when the user, while for example viewing a web page, continues viewing.

Next, the permission relationship information will be described.

For example, when a web page is displayed on a portable terminal, the user perceives the display to be fast or slow by feeling according to the time required to acquire and display all the information on the web page. When perceived as slow, there is a level that is permissible and a level that is not permissible depending on the user. For this reason, for example, when a web page is actually displayed using a portable terminal or the like, the user is asked to select whether the level is permissible or not permissible. Thereby, the use continuation possibility information that is the result of the selection and the objective indicator (for example, throughput) when the use continuation possibility information is transmitted are associated. A combination of a plurality of objective indicators respectively associated with use continuation possibility information is the permission relationship information.

Figures 2, 3:
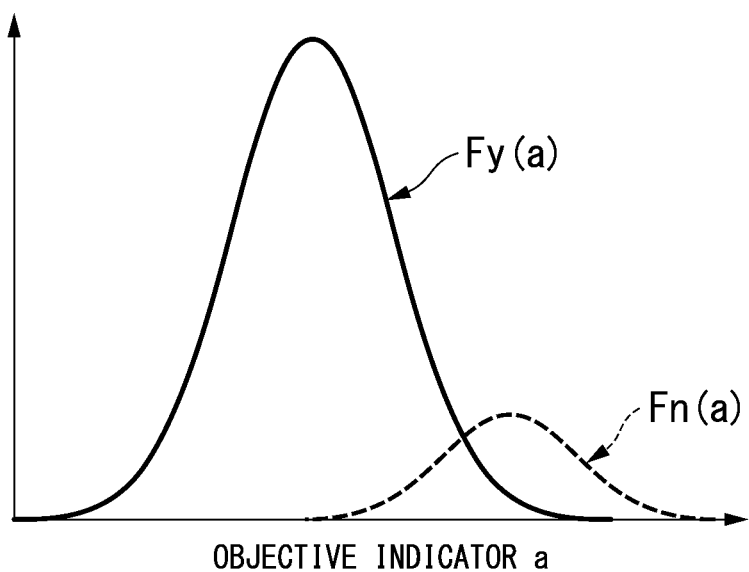
FIG. 2 is a drawing showing an example of permission relationship information stored in the storage unit according to the first embodiment.
FIG. 3 is a drawing showing an example of a frequency distribution Fy(a) and a frequency distribution Fn(a) according to the first embodiment.

FIG. 2 is a diagram illustrating an example of permission relationship information stored by the storage unit 101 according to the present embodiment. As illustrated in FIG. 2, the storage unit 101 stores the use continuation possibility information in association with objective indicators. In the example illustrated in FIG. 2, the use continuation possibility information in the case where the objective indicator is one of A1, A2, A3, A4, and A8 indicates that the user does not continue use. The use continuation possibility information in the case where the objective indicator is one of A5, A6, and A7 indicates that the user continues use. In the example illustrated in FIG. 2, the storage unit 101 stores, as the permission relationship information, the plurality of objective indicators and use continuation possibility information (information indicating whether the user will continue use in the case of that objective indicator, during the period in which the plurality of objective indicators are acquired) in association with each other.

Note that the storage unit 101 may be made to store objective indicators that become threshold values for switching between the user continuing use and not continuing use. That is, the relationship between the plurality of objective indicators and the use continuation possibility information in the permission relationship information may be associated using threshold values of the objective indicators.

Here, an example of the permission relationship information will be described.

In an example in which the objective indicator is throughput, for example, when the throughput is 100 Kbps, the user does not continue use. Even when the throughput is 200 Kbps, 300 Kbps, or 400 Kbps, the user does not continue use. On the other hand, when the throughput is 500 Kbps, the user continues use. Further, when the throughput is 600 Kbps or 700 Kbps, the user continues use. In this example, the storage unit 101 may store the fact that when the throughput is 400 Kbps or less, the user does not continue use, and when the throughput is 500 Kbps or more, the user continues use. That is, a threshold value (for example, a throughput of 500 Kbps) for switching between an objective indicator in which the user continues use and an objective indicator in which the user does not continue use may be stored.

Note that the permission relationship information may be expressed as a probability distribution Py(a), a probability distribution Pn(a), a frequency distribution Fy(a), or a frequency distribution Fn(a). The probability distribution Py(a) is a probability that the user continues use when the objective indicator is "a". The probability distribution Pn(a) is a probability that the user does not continue use when the objective indicator is "a". The frequency distribution Fy(a) is the number of users continuing use when the objective indicator is "a". The frequency distribution Fn(a) is the number of users who do not continue use when the objective indicator is "a". An example of the frequency distribution is shown in FIG. 3.

FIG. 3 is a drawing showing an example of the frequency distribution Fy(a) and the frequency distribution Fn(a) according to the present embodiment. In FIG. 3, the horizontal axis is the objective indicator "a", and the vertical axis is the frequency. The frequency distribution may be a tabular frequency distribution table. The storage unit 101 may store at least one of the probability distribution Py(a), the probability distribution Pn(a), the frequency distribution Fy(a), and the frequency distribution Fn(a).

As described above, the relationship between the plurality of objective indicators and the use continuation possibility information in the permission relationship information may be expressed by at least one of the distribution of users continuing use or the distribution of users not continuing use.

Next, an example of a processing procedure performed by the communication quality evaluation device 10 will be described.

Figure 4:
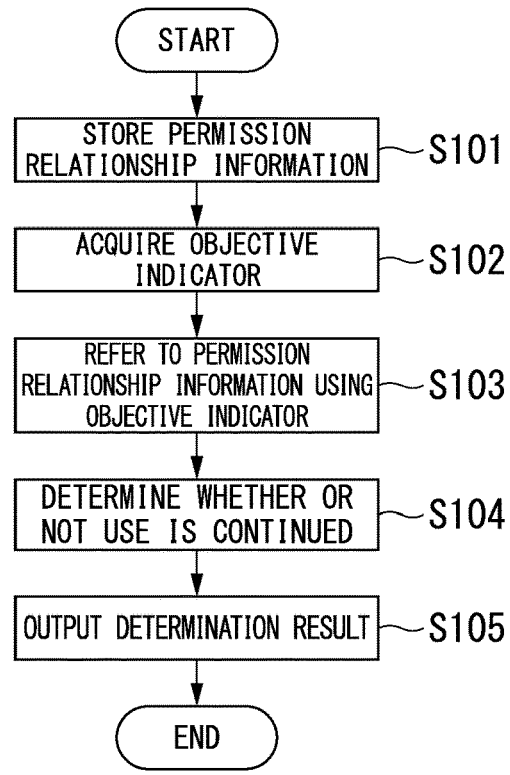
FIG. 4 is a flowchart of a processing procedure example performed by the communication quality evaluation device according to the first embodiment.

FIG. 4 is a flowchart of a processing procedure example performed by the communication quality evaluation device 10 according to this embodiment.

(Step S101) The indicator acquisition unit 102 acquires, for example, an objective indicator and use continuation possibility information from the base station 30, and stores the acquired objective indicator and use continuation possibility information in the storage unit 101 as permission relationship information.

(Step S102) The indicator acquisition unit 102 acquires an objective indicator from the base station 30, for example, and outputs the acquired objective indicator to the permission determination unit 106.

(Step S103) The permission determination unit 106 acquires the objective indicator output by the indicator acquisition unit 102, and refers to the permission relationship information stored in the storage unit 101 using the acquired objective indicator.

(Step S104) The permission determination unit 106 determines whether the user continues use on the basis of the result of referring to the permission relationship information. The permission determination unit 106 identifies the user of the portable terminal 20 on the basis of identification information of the portable terminal 20 included in the acquired objective indicator.

(Step S105) The permission determination unit 106 outputs the result of determining whether the user continues use, for example, to a display device, a printing device, or an external device. Note that the determination result includes information on users who continue use and information on users who do not continue use. The information on users may include, for example, identification information of the user's portable terminal 20 or information for identifying the user. Alternatively, the user information may include the number of users continuing use or the number of users not continuing use. Thereby, according to this embodiment, the number of users continuing use can be visualized.

Note that the communication quality evaluation device 10 performs the processing from Step S101 to Step S105 for each user.

Here, a specific example of the processing of FIG. 4 will be described.

As a specific example, a case in which the objective indicator is throughput will be described. First, the storage unit 101 stores, as permission relationship information, that when the throughput is 400 Kbps or less, the user does not continue use, and that when the throughput is 500 Kbps or more, the user continues to use.

In this case, when the throughput, which is the objective indicator acquired by the indicator acquisition unit 102, is 400 Kbps or less, the permission determination unit 106 determines that the user does not continue use. In addition, when the throughput, which is the objective indicator acquired by the indicator acquisition unit 102, is 500 Kbps or more, the permission determination unit 106 determines that the user continues use. Then, the permission determination unit 106 outputs a determination result.

Next, the case will be described of the storage unit 101 storing the probability distribution Py(a) of the user continuing use and the probability distribution Pn(a) of the user not continuing use as permission relationship information, and the objective indicator "a" being the throughput.

When the throughput at the time when the communication quality evaluation device 10 makes the determination is 550 Kbps, it is assumed that the probability of the user continuing use is "Py (550)=0.7". In this case, the permission determination unit 106 determines that the user will continue use with a probability of 70%.

The permission determination unit 106 also determines that the user continues use since probability "Py (550)>0.5". In this case, since the probability of the user continuing use exceeds 50%, the permission determination unit 106 determines that the user continues use.

The permission determination unit 106 also determines that the user continues use since probability "Py (550) (=0.7)">probability "Pn (550) (=0.3)". In this case, the probability that the user continues use to be greater than the probability of the user not continuing use. Accordingly, the permission determination unit 106 determines that the user continues use.

In this case, the permission determination unit 106 may compare the magnitude relationship between the probability distribution Py and the probability distribution Pn and determine whether or not the user continues use by for example the sign of the difference between the probability distribution Py and the probability distribution Pn. In this case, the permission determination unit 106 determines that the user continues use if the difference is positive, and determines that the user does not continue use if the difference is negative. The difference indicates, for example, a value obtained by subtracting the probability of the user not continuing using from the probability of the user continuing use.

Alternatively, the permission determination unit 106 may compare the difference between the probability distribution Py and the probability distribution Pn with a predetermined threshold value (the threshold value may be 0), and determine that the user continues use when the difference is greater than the threshold value. In this case as well, the difference indicates, for example, a value obtained by subtracting the probability of the user not continuing use from the probability of the user continuing use.

The permission determination unit 106 may also compare the ratio of the frequency distribution Fy to the frequency distribution Fn with a predetermined threshold value (the threshold value may be 1, for example), and when the ratio is greater than the threshold value, may determine that the user continues use. For example, in the case of frequency "Fy (550)=1400" and frequency "Fn (550)=600", the value of the ratio of the value "1400" to the value "600" is compared with a predetermined threshold value. In this case, when the ratio is larger than the threshold value, it is determined that the user continues use. The ratio indicates, for example, a value (=1400÷600) obtained by dividing the frequency of the users continuing use by the frequency of the users not continuing use.

In addition, the permission determination unit 106 determines that the user continues use with a probability of 70% and does not continue use with a probability of 30% in the case of probability "Py (550)=0.7" and probability "Pn (550)=0.3".

The permission determination unit 106 outputs the determination result.

The storage unit 101 may store all of the throughput, the probability distribution Py(a) of the user continuing use, and the probability distribution Pn(a) of the user not continuing use.

As described above, in the present embodiment, the communication quality evaluation device 10 stores the permission relationship information, and refers to the permission relationship information stored by the storage unit 101 using the objective indicator acquired when the user is using the communication network. Thereby, it is estimated whether or not the user continues use, that is, whether or not the contract is continued. In this way, the present embodiment acquires an objective indicator for each user instead of for example estimating the perceived communication quality for each user, and on the basis of the acquired objective indicator and the stored permission relationship information, estimates whether or not the user continues use.

Thereby, according to this embodiment, it can be determined with sufficient accuracy whether a user will continue a contract for use.

In the above-described example, the example was described of the communication quality evaluation device 10 being provided with the storage unit 101, but is not limited thereto. The storage unit 101 may be connected via a network, and the permission relationship information stored in the storage unit 101 may be placed on a resource of a cloud computing environment.

Second Embodiment

Next, a second embodiment will be described.

Figure 5:
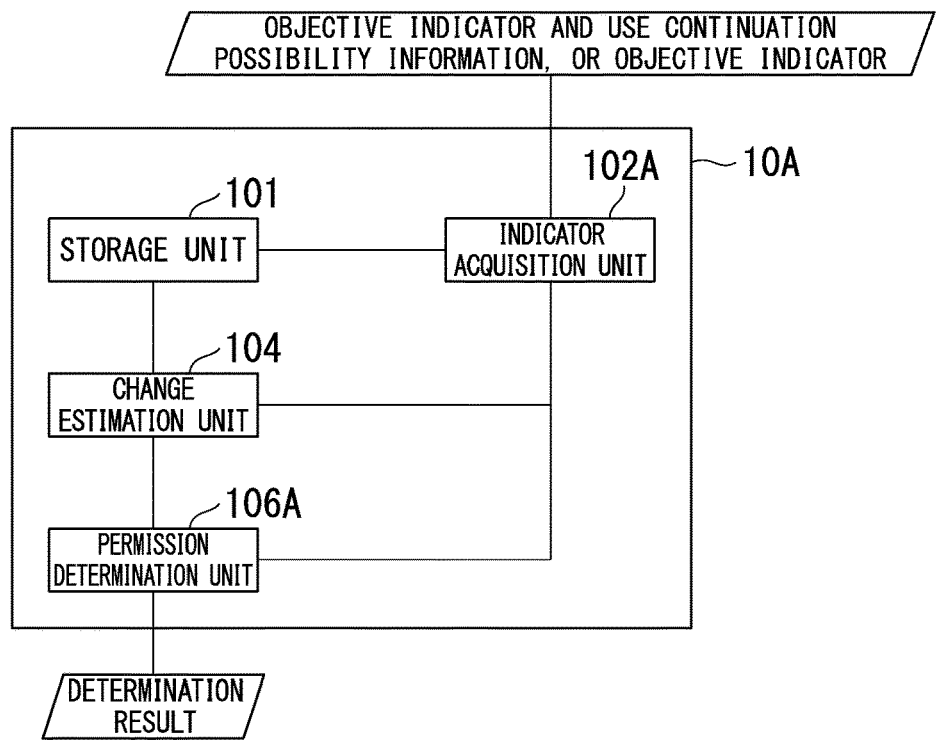
FIG. 5 is a block diagram showing a configuration example of a communication quality evaluation device according to the second embodiment.

FIG. 5 is a block diagram illustrating a configuration example of a communication quality evaluation device 10A according to the present embodiment. As illustrated in FIG. 5, the communication quality evaluation device 10A is provided with a storage unit 101, an indicator acquisition unit 102A, a change estimation unit 104, and a permission determination unit 106A. In addition, function units similar to function units that the communication quality evaluation device 10 (FIG. 1) is provided with are denoted using the same reference numerals, with descriptions thereof being omitted. In FIG. 5, the portable terminal 20 and the base station 30 are omitted.

The indicator acquisition unit 102A acquires, for example, an objective indicator and use continuation possibility information transmitted by the base station 30 (FIG. 1), and stores the acquired objective indicator and use continuation possibility information in the storage unit 101 as permission relationship information. The indicator acquisition unit 102A acquires the objective indicator transmitted by the base station 30, and outputs the acquired objective indicator to the change estimation unit 104 and the permission determination unit 106A. Similarly to the first embodiment, the permission relationship information is acquired before the point in time when the permission determination unit 106A makes a determination.

The change estimation unit 104 acquires the objective indicator output by the indicator acquisition unit 102A. The change estimation unit 104, using the acquired objective indicator and with reference to the permission relationship information stored in the storage unit 101, estimates whether the permission relationship information has changed. In the case of having changed, the change estimation unit 104 estimates new permission relationship information to which the change is added. When there is no change, the change estimation unit 104 makes the permission relationship information stored in the storage unit 101 new permission relationship information.

The permission determination unit 106A, using the objective indicator output by the indicator acquisition unit 102A and with reference to the new permission relationship information estimated by the change estimation unit 104, determines whether the user will continue use. The permission determination unit 106A outputs the determination result to, for example, a display device, a printing device, or an external device.

The process performed by the change estimation unit 104 will be further described.

Here, it is assumed that while the objective indicator itself at the point in time at which the determination is made (the present, the determination time) can be acquired, the latest permission relationship information cannot be acquired. That is, while the permission relationship information prior to the determination time is acquired, the most recent permission relationship information at the determination time is not acquired.

As an example, the change estimation unit 104 applies a change of a statistic including a representative value of an objective indicator to the permission relationship information. The change estimation unit 104 applies, for example, a change in a value such as the average value, mode value, maximum value, minimum value, deviation, and percentile value of the objective indicator to the permission relationship information. When there is a difference between the objective indicator and the absolute value of the permission relationship information, the value may be normalized.

As another example, the change estimation unit 104 assumes a distribution model of an objective indicator, estimates a change in that parameter, and estimates a distribution model of the permission relationship information. For example, the change estimation unit 104 finds a parameter such that the distance between the distribution of the objective indicator and the estimated distribution of the objective indicator at the point in time at which the communication quality evaluation device 10A makes the determination becomes a minimum.

Next, an example of processing performed by the change estimation unit 104 and the permission determination unit 106A will be described.

First, an example in which the objective indicator in the permission relationship information stored in the storage unit 101 is throughput will be described.

Figures 6, 7:
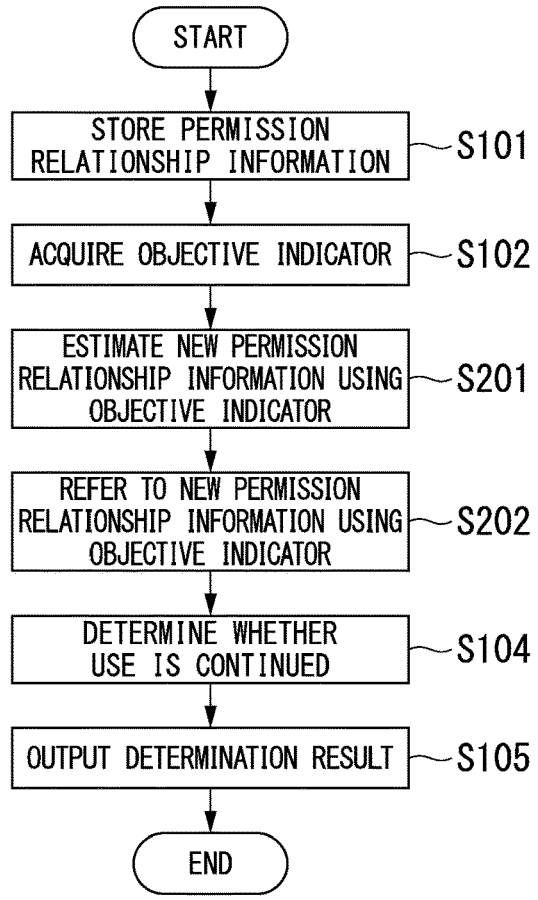
FIG. 6 is a diagram showing an example of permission relationship information stored in the storage unit of the second embodiment.
FIG. 7 is a flowchart of a processing procedure example performed by the communication quality evaluation device according to the second embodiment.

FIG. 6 is a diagram illustrating an example of the permission relationship information stored in the storage unit 101 according to the present embodiment. As shown in FIG. 6, according to the permission relationship information stored in the storage unit 101, the user does not continue use when the throughput is 400 Kbps or less, and the user continues use when the throughput is 500 Kbps or more. The change estimation unit 104 obtains an average value of the throughput, which is an average value of the objective indicator. In FIG. 6, the average value of the throughput is 500 Kbps. The storage unit 101 stores the statistical amount of the objective indicator within the period in which the use continuation possibility information of the permission relationship information was acquired.

Next, the change estimation unit 104 obtains the average value of the objective indicator acquired by the indicator acquisition unit 102A for a predetermined period. The predetermined period is, for example, a week (also referred to as the latest week) including the day for obtaining an average value. Here, it is assumed that the average value of the obtained throughput for the latest week is 600 Kbps. The objective indicator acquired in this way is, for example, the throughput during state in which the user continues browsing a web page. The state in which browsing of a web page is continued is the state in which a stop instruction is not given by the user during the loading of a web page, and one page is continuously displayed for a predetermined time (reading state), with the browsing being continued by moving to another page that is linked from that page. Alternatively, the state in which browsing of a web page is continued is a state in which a search is performed and browsing of a new page is browsed. In such a state, since the user continues browsing, it can be said that the throughput is such that the user may continue use. On the other hand, when a reading stop instruction is issued during page loading, it can be said that the throughput is in a state in which the user does not want to continue use.

The average value of the throughput for the latest week increases by 100 Kbps with respect to the average value of throughput stored in the storage unit 101. For this reason, the change estimation unit 104 sets the new permission relationship information to the user not continuing use when the when the throughput is 500 Kbps (=400 Kbps+100 Kbps) or less, and to the user continuing use when the throughput is 600 Kbps (=500 Kbps+100 Kbps) or more.

As described above, when the average value of the throughput increases and thereby the use environment improves, the user gets used to the improved use environment. As a result, in the case of a throughput of 500 Kbps, regardless of whether a user was going to continue use prior to the use environment improving, after the use environment has improved, the user may want to continue use. In this case, the correspondence relation (permission relationship information) between the throughput and the use continuation possibility information changes. Accordingly, the change estimation unit 104 estimates the change in the permission relationship information on the basis of the change in the statistical amount of the objective indicator at the time of determination with respect to the statistical amount of the objective indicator in the period when the permission relationship information was acquired. In other words, the change estimation unit 104 acquires the change in the average value of the throughput from the period in which the permission relationship information was acquired to the determination time, and estimates new permission relationship information on the basis of the change.

When the acquired objective indicator is 500 Kbps, the permission determination unit 106A determines that the user does not continue use. That is, the permission determination unit 106A determines that the user does not continue use when the throughput is 500 Kbps based on the estimated new permission relationship information.

Next, the case will be described of the storage unit 101 storing the frequency distribution Fy(a) of users continuing use and the frequency distribution Fn(a) of users not continuing use as permission relation information, with the objective indicator "a" denoting throughput. Here, the frequency distribution Fw(a) between the objective indicator and the users is defined as "Fw(a)=xFy(a)+yFn(a)". "x" and "y" are parameters.

The frequency distribution Fy(a) and the frequency distribution Fn(a) are determined by the parameter string μ. The parameter string μ indicates, for example, an average value or a variance value of a distribution sample. The parameter string μ of the frequency distribution Fy(a) is expressed as a value "μy", and the parameter string μ of the frequency distribution Fn(a) is expressed as a value "μn".

The information stored by the storage unit 101 is expressed with the suffix "1". That is, the frequency distribution between the objective indicators and the users stored by the storage unit 101 is expressed as Fw1(a). The frequency distribution Fw1(a) between the objective indicator and the users is defined as "Fw1(a)=x1Fy(a)+y1Fn(a)". The parameter string μ of the frequency distribution Fy(a) is expressed as a value "μy1", and the parameter string μ of the frequency distribution Fn(a) is expressed as a value "μn1".

The change estimation unit 104 estimates the parameters "x1", "y1", "μy1", and "μn1" constituting the frequency distribution Fw1(a) on the basis of the objective indicator stored by the storage unit 101.

Next, the change estimation unit 104 acquires the objective indicator output by the indicator acquisition unit 102A, and makes the distribution of the objective indicator and the users at the time when the communication quality evaluation device 10A makes a determination a frequency distribution Fwr(a). The suffix "r" indicates a value at the time when the communication quality evaluation device 10A makes the determination. Next, the change estimation unit 104 estimates the parameters "x2", "y2", "μy2", "μn2" which minimize "Fwr(a)−Fw2(a)", with the parameter of the suffix "1" as an initial value. The frequency distribution Fw2(a) between the objective indicator and the user is defined as "Fw2(a)=x2Fy(a)+y2Fn(a)". The parameter string μ of the frequency distribution Fy(a) is expressed as a value "μy2", and the parameter string μ of the frequency distribution Fn(a) is expressed as a value "μn2".

In this way, the change estimation unit 104 finds a parameter that minimizes the distance between the frequency distribution Fwr(a) at the time of the determination and the estimated frequency distribution Fw2(a). In other words, the change estimation unit 104 estimates the parameters of the frequency distribution Fw2(a) on the basis of the frequency distribution Fwr(a) at the time of determination and the frequency distribution Fw1(a) stored by the storage unit 101.

Next, the change estimation unit 104 sets new permission relationship information assuming that the user continues use when "x2Fy2(a)>y2Fn2(a)", and assuming that the user does not continue use when not "x2Fy2(a)>y2Fn2(a)".

The permission determination unit 106A, using the objective indicator output by the indicator acquisition unit 102A and with reference to the new permission relationship information estimated in this way, determines whether the user continues use.

Note that the storage unit 101 may store all of the throughput, the frequency distribution Fy(a) of the users continuing use, and the frequency distribution Fn(a) of the users not continuing use.

In the example described above, the change estimation unit 104 may perform a comparison of the frequency distribution x2Fy2(a) and the frequency distribution y2Fn2(a) depending on the sign of the difference between the frequency distribution x2Fy2(a) and the frequency distribution y2Fn2(a). In this case, the change estimation unit 104 sets information indicating whether or not the user continues use depending on the sign of the difference as new permission relationship information. Alternatively, the change estimation unit 104 compares the difference between the frequency distribution x2Fy2(a) and the frequency distribution y2Fn2(a) with a predetermined threshold value. The change estimation unit 104 may use information indicating whether or not the user continues use according to the comparison result as new permission relationship information. Alternatively, the change estimation unit 104 finds the ratio of the frequency distribution x2Fy2(a) to the frequency distribution y2Fn2(a), and compares the obtained ratio with a predetermined threshold value. The change estimation unit 104 may set information indicating whether or not the user continues use as new permission relationship information depending on the comparison result.

Next, an example of a processing procedure performed by the communication quality evaluation device 10A will be described.

FIG. 7 is a flowchart of a processing procedure example performed by the communication quality evaluation device 10A according to the present embodiment. Note that processes that are the same as those of FIG. 4 of the first embodiment are denoted using the same reference numerals, with descriptions thereof being omitted.

(Step S101 to Step S102) The communication quality evaluation device 10A performs the processing of Step S101 to Step S102, and proceeds to the processing of Step S201 after the processing.

(Step S201) The change estimation unit 104 estimates new permission relationship information using the objective indicator output by the indicator acquisition unit 102A. For example, the change estimation unit 104 compares the objective indicator at the time when the communication quality evaluation device 10A makes a determination with a plurality of objective indicators stored by the storage unit 101, and calculates the change. Then, the change estimation unit 104 adds that change to the permission relationship information on the basis of the calculated change in the objective indicator, and estimates new permission relationship information.

(Step S202) The permission determination unit 106A uses the objective indicator output by the indicator acquisition unit 102A to refer to the new permission relationship information estimated by the change estimation unit 104. After the process, the permission determination unit 106A proceeds to the process of Step S104.

(Step S104) The permission determination unit 106A determines whether or not the user continues use based on the result of the referencing. The permission determination unit 106A identifies the user of the portable terminal 20 based on the identification information of the portable terminal 20 included in the acquired objective indicator.

(Step S105) The permission determination unit 106A outputs the determination result to, for example, a display device, a printing device, or an external device. Note that the determination result includes information on users who continue use and information on users who do not continue use. Thereby, according to this embodiment, the number of users who continue use can be visualized.

Note that the communication quality evaluation device 10 performs the processing of steps S101 to S102, steps S201 to S202, and steps S104 to S105 for each user.

As described above, in this embodiment, the communication quality evaluation device 10A is provided with the change estimation unit 104 so as to estimate the change in the permission relationship information.

Thus, according to the present embodiment, in addition to the effects of the first embodiment, it is possible to accurately determine whether or not a user continues use even when the permission relationship information has changed.

In the above-described example, the example was described of the communication quality evaluation device 10A being provided with the storage unit 101, but is not limited thereto. Similarly to the first embodiment, the storage unit 101 may be connected via a network, and the permission relationship information stored in the storage unit 101 may be placed on a resource of a cloud computing environment.

Third Embodiment

Next, a third embodiment will be described.

Figure 8:
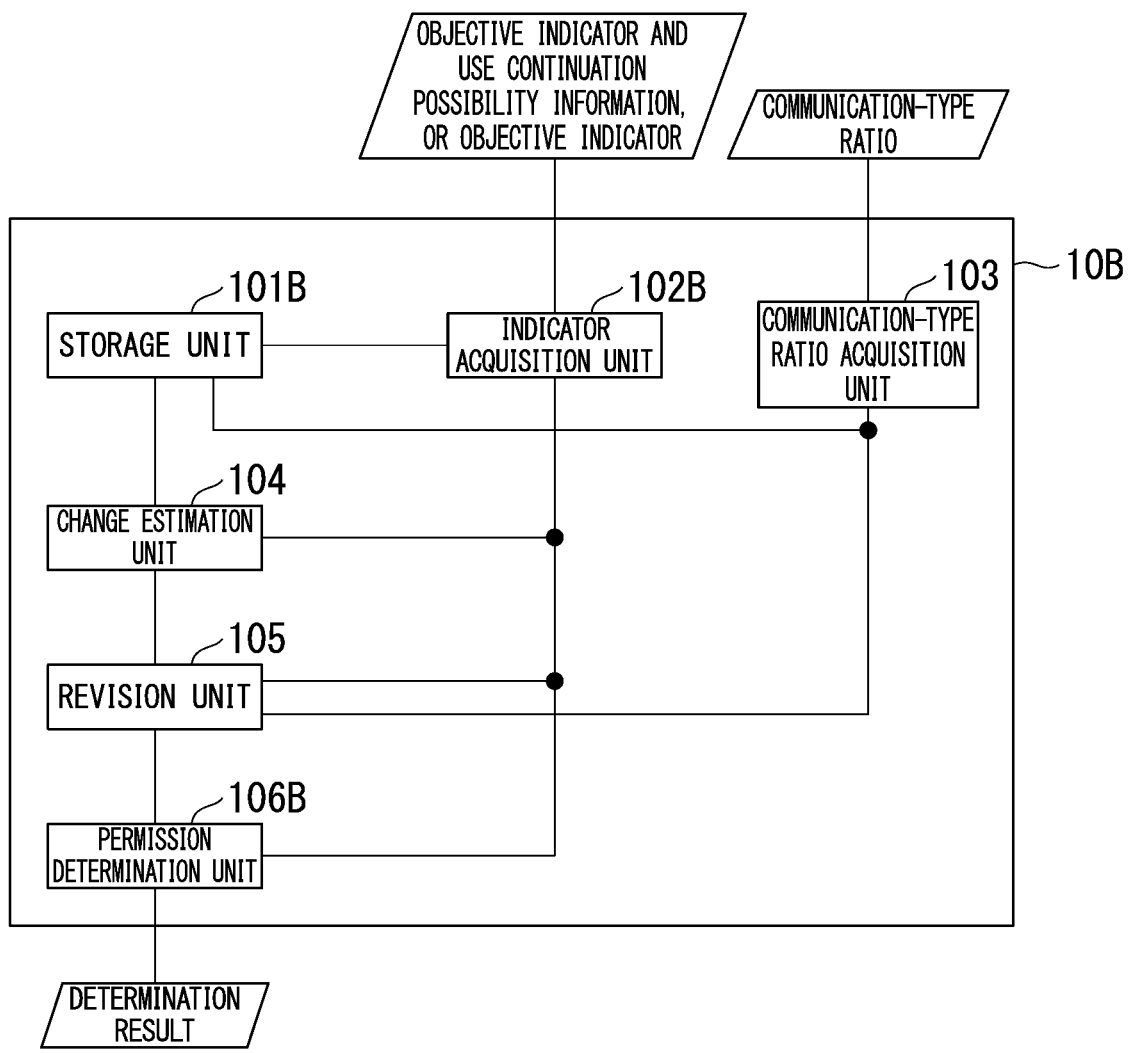
FIG. 8 is a block diagram showing a configuration example of a communication quality evaluation device according to the third embodiment.

FIG. 8 is a block diagram illustrating a configuration example of a communication quality evaluation device 10B according to the present embodiment. As illustrated in FIG. 8, the communication quality evaluation device 10B is provided with a storage unit 101B, an indicator acquisition unit 102B, a communication-type ratio acquisition unit 103, a change estimation unit 104, a revision unit 105, and a permission determination unit 106B. In addition, function units similar to function units that the communication quality evaluation device 10 (FIG. 1) and the communication quality evaluation device 10A (FIG. 5) are provided with are denoted using the same reference numerals, with descriptions thereof being omitted. In FIG. 8, the portable terminal 20 and the base station 30 are omitted.

The indicator acquisition unit 102B acquires, for example, the objective indicator and use continuation possibility information transmitted by the base station 30 (FIG. 1), and stores the acquired objective indicator and use continuation possibility information in the storage unit 101B as permission relationship information. The indicator acquisition unit 102B acquires the objective indicator transmitted by the base station 30, and outputs the acquired objective indicator to the change estimation unit 104, the revision unit 105, and the permission determination unit 106B. As in the first embodiment and the second embodiment, the permission relationship information is acquired prior to the point in time when the permission determination unit 106B makes a determination.

The communication-type ratio acquisition unit 103 acquires a communication-type ratio during the period when the permission relationship information is examined, and stores the acquired communication-type ratio in the storage unit 101B. Further, the communication-type ratio acquisition unit 103 acquires the communication-type ratio at the time when the communication quality evaluation device 10B performs estimation, and outputs the acquired communication-type ratio to the revision unit 105. The communication-type ratio is the ratio of contracts by users of different communication types. For example, when the first communication type is the third-generation mobile communication system (hereinafter referred to as 3G) call standard and the second communication type is the LTE call standard, the communication-type ratio is the ratio of contracts of users of 3G and LTE. That is, the communication-type ratio indicates, for example, the ratio between users with 3G contracts and users with LTE contracts.

The storage unit 101B stores the permission relationship information and the communication-type ratio during the period when the permission relationship information was acquired. The storage unit 101B stores for example the correspondence relation between a plurality of objective indicators and use continuation possibility information (information indicating whether or not the user continues uses in the case of the objective indicators during the period when the plurality of objective indicators are acquired), and the communication-type ratio in the period when the plurality of objective indicators are acquired.

The change estimation unit 104 acquires an objective indicator output by the indicator acquisition unit 102B. The change estimation unit 104 uses the acquired objective indicator to estimate whether or not the permission relationship information has changed by referring to the permission relationship information stored in the storage unit 101B. In the case of having changed, the change estimation unit 104 estimates new permission relationship information to which the change is added. When there is no change, the change estimation unit 104 sets the permission relationship information stored in the storage unit 101B as new permission relationship information.

The revision unit 105 finds a change between the communication-type ratio acquired by the communication-type ratio acquisition unit 103 when the communication quality evaluation device 10B determines whether the user continues use and the communication-type ratio stored by the storage unit 101B. The revision unit 105 revises the new permission relationship information estimated by the change estimation unit 104 on the basis of the change between the communication-type ratios that was found. That is, the revision unit 105 revises the new permission relationship information on the basis of the change in the communication-type ratio at the time of determination with respect to the communication-type ratio stored in the storage unit 101B.

The permission determination unit 106B, using the objective indicator output by the indicator acquisition unit 102B and with reference to the permission relationship information revised by the revision unit 105, determines whether or not the user continues use. The permission determination unit 106B outputs the determination result to, for example, a display device, a printing device, or an external device.

Next, the relationship between the communication-type ratio and the permission relationship information will be described. Here, for example, there are two types of communication, that is, 3G and LTE. The objective indicator value will be described as throughput.

It is considered that the throughput band Th3G in which a user using 3G is determined to continue use is different from the throughput band ThLTE in which a user using LTE is determined to continue use. The throughput band Th3G is generally lower than the throughput band ThLTE. This is because users using 3G are accustomed to lower throughput than users using LTE. That is, there exists a threshold value Ththr of the throughput bands at which users who use LTE do not continue use, but users who use 3G continue use.

When a certain user shifts from using 3G to using LTE, at the threshold Ththr the number of users who continue use decreases, while the number of users who do not continue use increases. Therefore, when the communication-type ratio changes, the relationship changes in some objective indicator bands in the relationship between the objective indicator and the use continuation possibility information. For this reason, when the communication-type ratio has changed, the permission relationship information used for the determination is revised.

Next, an example of a revision method performed by the revision unit 105 will be described.

The revision unit 105 performs further revision if, with regard to new permission relationship information estimated by the change estimation unit 104, the distance between the distribution of the objective indicator at the time of the communication quality evaluation device 10B making a determination and the estimated distribution of objective indicator is equal to or greater than a predetermined value. For example, the revision unit 105 revises the estimated distribution of the objective indicator when the estimated distribution of objective indicator deviates from the distribution of the objective indicator at the time of determination by a predetermined value or more.

For example, the revision unit 105 finds a difference between the distribution of the objective indicator at the time when the communication quality evaluation device 10B makes a determination and the estimated distribution of objective indicator, and performs a revision by adding a distribution based on the difference to the permission relationship information.

Next, an example of a processing procedure performed by the communication quality evaluation device 10B will be described.

Figure 9:
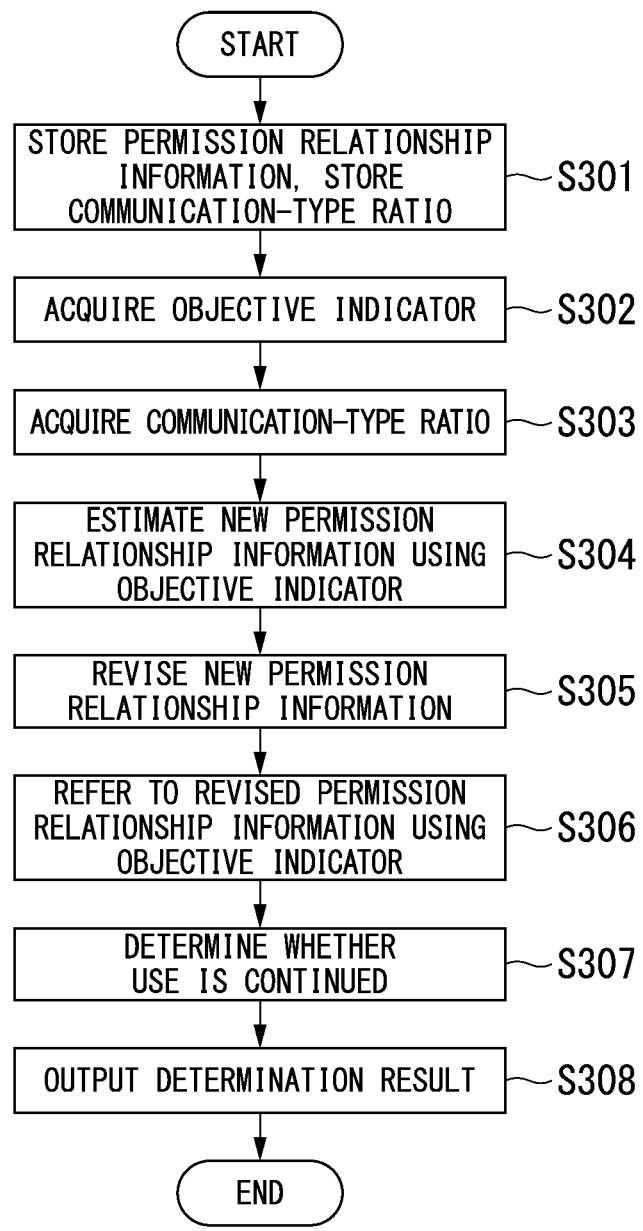
FIG. 9 is a flowchart of a processing procedure example performed by the communication quality evaluation device according to the third embodiment.

FIG. 9 is a flowchart of the processing procedure example performed by the communication quality evaluation device 10B according to the present embodiment.

(Step S301) The indicator acquisition unit 102B acquires, for example, the objective indicator and the use continuation possibility information transmitted from the base station 30 (FIG. 1), and stores the acquired objective indicator and use continuation possibility information in the storage unit 101 as permission relationship information. Subsequently, the communication-type ratio acquisition unit 103 acquires the communication-type ratio during the period in which the permission relationship information is examined, and stores the acquired communication-type ratio in the storage unit 101B.

(Step S302) The indicator acquisition unit 102 acquires an objective indicator from, for example, the base station 30, and outputs the acquired objective indicator to the change estimation unit 104, the revision unit 105, and the permission determination unit 106B.

(Step S303) The communication-type ratio acquisition unit 103 acquires the communication-type ratio at the time when the communication quality evaluation device 10B performs estimation, and outputs the acquired communication-type ratio to the revision unit 105.

(Step S304) The change estimation unit 104 estimates new permission relationship information using the objective indicator output by the indicator acquisition unit 102B. For example, the change estimation unit 104 compares the objective indicator at the time when the communication quality evaluation device 10B makes a determination with the plurality of objective indicators stored in the storage unit 101B, and finds the change. Then, the change estimation unit 104 makes a change to the permission relationship information on the basis of the obtained change in the objective indicator, and estimates new permission relationship information.

(Step S305) The revision unit 105 finds the change between the communication-type ratio acquired by the communication-type ratio acquisition unit 103 at the time when the communication quality evaluation device 10B makes a determination and the communication-type ratio stored in the storage unit 101B. Subsequently, the revision unit 105 revises the new permission relationship information estimated by the change estimation unit 104 on the basis of the obtained change in the communication-type ratios. For example, the revision unit 105 revises the new permission relationship information by making a change to the estimated new permission relationship information based on the obtained change in the communication-type ratio.

Note that the revision unit 105 may perform revision when the difference between the distribution of the objective indicator at the time when the determination is performed and the distribution of the objective indicator in the estimated new permission relationship information is greater than or equal to a predetermined value.

(Step S306) The permission determination unit 106B refers to the new permission relationship information revised by the revision unit 105 using the objective indicator at the time when the communication quality evaluation device 10B makes a determination.

(Step S307) The permission determination unit 106B determines whether or not the user continues use on the basis of the revised new permission relationship information that has been referenced. The permission determination unit 106B identifies the user of the portable terminal 20 on the basis of the identification information of the portable terminal 20 included in the acquired objective indicator.

(Step S308) The permission determination unit 106B outputs the determination result to, for example, a display device, a printing device, or an external device. Note that the determination result includes information on users who continue use and information on users who do not continue use. Thereby, according to this embodiment, the number of users who continue use can be visualized.

Note that the communication quality evaluation device 10B performs the processing from Step S301 to Step S308 for each user.

Next, an example of processing performed by the change estimation unit 104, the revision unit 105, and the permission determination unit 106B will be described. Note that the storage unit 101B stores the frequency distribution Fy(a) of users continuing use and the frequency distribution Fn(a) of users not continuing use, with the objective indicator "a" denoting the throughput.

As in the second embodiment, the frequency distribution Fw(a) between the objective indicator and the users is defined as "Fw(a)=xFy(a)+yFn(a)". The frequency distribution Fy(a) and the frequency distribution Fn(a) are determined by the parameter string $\mu$. The parameter string $\mu$ of the frequency distribution Fy(a) is expressed as a value "$\mu y$", and the parameter string $\mu$ of the frequency distribution Fn(a) is expressed as a value "$\mu n$". The information stored in the storage unit 101B is expressed with the suffix "1". As described above, the frequency distribution between the objective indicators and the users stored by the storage unit 101B is expressed as Fw1(a). As described above, the frequency distribution Fw1(a) is defined as "Fw1(a)=x1Fy(a)+y1Fn(a)", with the parameter string $\mu$ of the frequency distribution Fy(a) and the parameter string $\mu$ of the frequency distribution Fn(a) expressed as "$\mu y1$" and "$\mu n1$", respectively.

First, the change estimation unit 104 estimates the parameters "x1", "y1", "$\mu y1$", and "$\mu n1$" constituting the frequency distribution Fw1(a) on the basis of the objective indicators stored in the storage unit 101B.

Next, the change estimation unit 104 acquires the objective indicator output by the indicator acquisition unit 102B, and makes the distribution of the objective indicator and the users at the time when the communication quality evaluation device 10B makes a determination the frequency distribution Fwr(a). The suffix "r" indicates a value at the time when the communication quality evaluation device 10B makes the determination.

Next, the change estimating unit 104 estimates the parameters "x2", "y2", "$\mu y2$" and "$\mu n2$" that minimize the distance D between Fwr(a) and Fw2(a) with the parameter of the suffix "1" as an initial value. As described above, the frequency distribution Fw2(a) between the objective index and the users is defined as "Fw2(a)=x2Fy(a)+y2Fn(a)". The parameter string $\mu$ of the frequency distribution Fy(a) is expressed as a value "$\mu y2$", and the parameter string $\mu$ of the frequency distribution Fn(a) is expressed as a value "$\mu n2$".

However, if the assumed distribution model itself is changing, estimation is insufficient even if the distance D is minimized by these parameters. When the communication-type ratio changes, the model itself may change. For this reason, in this embodiment, the revision unit 105 performs further revision with respect to the permission relationship information, when "distance D≥ThFw". In other words, the revision unit 105 revises the distribution Fw2(a) when the distance D between the estimated objective indicator distribution Fw2(a) and the objective indicator distribution Fwr(a) at the time when determination is performed is equal to or greater than the threshold value "ThFw".

Here, it is assumed that there are two types of communication, namely, LTE and 3G.

When "$\Delta$=Fwr(a)−Fw2(a)", "$\Delta 1=w\Delta$, $\Delta 2=(1+w)\Delta$" and "w=0.2" are set. Note that an arbitrary value is set as the value "w", and "w=0" may be set.

If the number of LTE users is increasing in the communication-type ratio, revision is performed using the following Equation (1). Note that the value "x2Fy2(a)" and the value "y2Fn2(a)" in Equation (1) each represent a post-revision value. According to Equation (1), when the number of LTE users has increased, the frequency of users continuing use decreases, and the frequency of users not continuing use increases.

$$x2Fy2(a)=x2Fy2(a)-\Delta1$$

$$y2Fn2(a)=y2Fn2(a)+\Delta2 \qquad (1)$$

When the number of LTE users is decreasing in the communication-type ratio, revision is performed using the following Equation (2). Similarly to Equation (1), the value "x2Fy2(a)" and the value "y2Fn2(a)" in Equation (2) represent values after revision. According to Equation (2), when the number of LTE users decreases, the frequency of users continuing use increases and the frequency of users not continuing use decreases.

$$x2Fy2(a)=x2Fy2(a)+\Delta2$$

$$y2Fn2(a)=y2Fn2(a)-\Delta1 \qquad (2)$$

As described above, in the present embodiment, the communication quality evaluation device 10B is further provided with the communication-type ratio acquisition unit 103 and the revision unit 105, and revises, on the basis of the communication-type ratio, the new permission relationship information that has been estimated.

Thereby, according to this embodiment, in addition to the effects of the first embodiment and the second embodiment, it is possible to accurately determine whether or not a user continues use when the communication-type ratio has changed.

In the above-described example, the example was described of the communication quality evaluation device 10B being provided with the storage unit 101B, but is not limited thereto. Similarly to the first embodiment, the storage unit 101B may be connected via a network, and the permission relationship information stored in the storage unit 101B may be placed on a resource of a cloud computing environment.

The communication quality evaluation device 10 (or 10A, 10B) in the above-described embodiment has a computer system therein. The processing of the communication quality evaluation device 10 (or 10A, 10B) described above is stored in a computer-readable recording medium in the form of a program. The above processing is performed by the computer reading and executing the recorded program. Here, the computer-readable recording medium means a magnetic disk, a magneto-optical disk, a CD-ROM, a DVD-ROM, a semiconductor memory, or the like. Alternatively, the computer program may be distributed to a computer through communication lines, and the computer that has received the distribution may execute the program.

Figure 10:
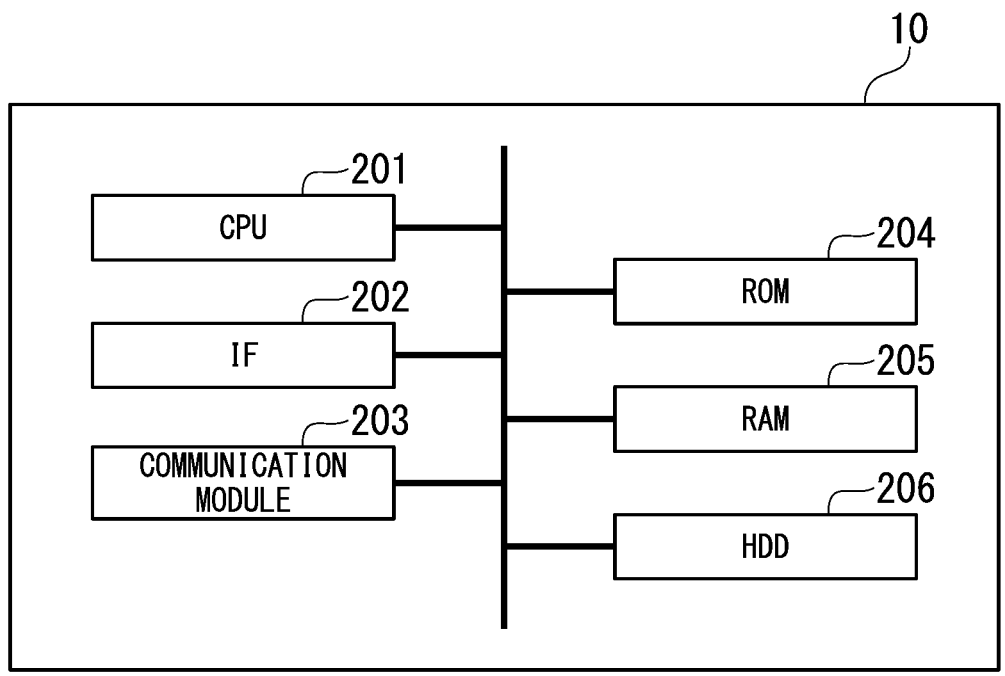
FIG. 10 is a block diagram of a configuration example in which the communication quality evaluation device according to the embodiment is constituted by a computer system.

FIG. 10 is a block diagram of a configuration example in which the communication quality evaluation device 10 according to the embodiment is constituted by a computer system. As shown in FIG. 10, the communication quality evaluation device 10 is provided with a CPU 201, an IF 202, a communication module 203, a ROM 204, a RAM 205, and an HDD 206.

The CPU (Central Processing Unit) 201 performs the processing of the permission determination unit 106 (FIG. 1).

The IF (interface) 202 is an interface unit with a keyboard, a touch panel, a display device, and an output device (not shown).

The communication module 203 performs processing of the indicator acquisition unit 102 (FIG. 1) and performs communication with the base station 30 (FIG. 1).

The ROM (Read Only Memory) 204 is an area for storing, for example, BIOS (Basic Input/Output System) of the communication quality evaluation device 10.

The RAM (Random Access Memory) 205 is an area for temporarily storing information necessary for the operation of the CPU 201.

The HDD (Hard Disk Drive) 206 stores the OS (Operating System) and information stored by the storage unit 101. The HDD 206 may be an SSD (Solid State Drive).

While FIG. 10 describes an example in which the communication quality evaluation device 10 is constituted by a computer system, the communication quality evaluation devices 10A and 10B may be configured by a computer system. When the communication quality evaluation device 10A is constituted with a computer, the storage unit 101 (FIG. 5) corresponds to the HDD 206, the indicator acquisition unit 102A (FIG. 5) corresponds to the communication module 203, and the change estimation unit 104 (FIG. 5) and the permission determination unit 106A (FIG. 5) correspond to the CPU 201. When the communication quality evaluation device 10B is constituted by a computer, the storage unit 101B (FIG. 8) corresponds to the HDD 206, and the indicator acquisition unit 102B (FIG. 8) and the communication-type ratio acquisition unit 103 (FIG. 8) correspond to the communication module 203. The change estimation unit 104 (FIG. 8) and the permission determination unit 106B (FIG. 8) correspond to the CPU 201.

A program for realizing all or some of the functions of the communication quality evaluation device 10 (or 10A, 10B) in the embodiment may be recorded on a computer-readable storage medium, and the program recorded on this recording medium may be read into a computer system and executed to thereby perform all or some of the processes performed by the communication quality evaluation device 10 (or 10A, 10B). Note that "computer system" here includes an operating system (OS) or hardware such as peripheral devices. Furthermore, the "computer system" includes a WWW system provided with a homepage provision environment (or display environment). The "computer readable recording medium" refers to a portable medium such as a flexible disk, a magneto-optical disc, a ROM, or a CD-ROM, and a storage device such as a hard disk housed in a computer system. Moreover, the "computer-readable recording medium" includes a medium that retains the program for a certain period of time such as volatile memory (RAM) in a computer system that becomes a server or a client when a program is transmitted through a network such as the Internet or a communication line such as a telephone line.

The aforementioned program may be transmitted from a computer system having this program stored in a storage device thereof to another computer system via a transmission media or by transmission waves in the transmission media. The term "transmission media" that transmits the program includes a media having a function for transferring information, such as a network (communication network) such as the Internet, or a communication line (communication cable) such as a telephone line. In addition, the program may be for realizing a part of the aforementioned functions. Furthermore, the program may be a so-called differential file (differential program), whereby the functions described above can be realized by combination with programs that are already recorded in the computer system.

While best modes for carrying out the invention have been described above using the embodiments, the invention is not limited to such embodiments at all and various modifications and substitutions can be made in a range not departing from the spirit or scope of the present invention.

INDUSTRIAL APPLICABILITY

The present invention can provide a communication quality evaluation device, a communication quality evaluation method, and a communication quality evaluation program capable of determining whether a user will continue a contract for use.

REFERENCE SIGNS LIST

1: Communication system
10, 10A, 10B: Communication quality evaluation device
101: Storage unit
102, 102A, 102B: Indicator acquisition unit
103: Communication-type ratio acquisition unit
104: Change estimation unit
106, 106A, 106B: Permission determination unit

The invention claimed is:

1. A communication quality evaluation device comprising:
at least one memory configured to store permission relationship information indicating a relationship between a plurality of first objective indicators, indicating communication quality, and use continuation possibility information indicating whether a user will continue to use a communication service in the case of each of the plurality of first objective indicators; and
at least one processor configured to execute instructions to:
receive, while the user is using the communication service on a portable terminal, the use continuation possibility information via a base station from the portable terminal;
receive a first objective indicator from the base station;
store the received use continuation possibility information and the received first objective indicator into the at least one memory in association with each other;
acquire a second objective indicator at a point in time at which the communication quality evaluation device makes a determination; and
determine, using the acquired second objective indicator and with reference to the permission relationship information stored in the at least one memory, whether the user will continue to use the communication service on a basis of a result of referencing the permission relationship information.

2. The communication quality evaluation device according to claim 1,
wherein the at least one processor is configured to execute the instructions to:
acquire the use continuation possibility information and the plurality of first objective indicators corresponding the use continuation possibility information for a predetermined period prior to the point in time of the determination;
estimate, on a basis of a change in second objective indicator at the point in time of the determination with respect to the plurality of first objective indicators stored in the at least one memory, a change in the permission relationship information at the point in time of the determination to estimate new permission relationship information; and
determine whether the user continues use on a basis of the estimated new permission relationship information.

3. The communication quality evaluation device according to claim 2, wherein
the at least one processor is further configured to execute the instructions to acquire a first communication-type ratio in the predetermined period in which the permission relationship information was acquired and a second communication-type ratio at the point in time of the determination, the communication-type ratios indicating use ratios of a plurality of communication types in relation to the communications,
the at least one memory further stores the first communication-type ratio, and
the at least one processor is further configured to execute the instructions to revise the estimated new permission relationship information on a basis of a change in the second communication-type ratio with respect to the first communication-type ratio.

4. The communication quality evaluation device according to claim 1, wherein the relationship between the plurality of first objective indicators and the use continuation possibility information is associated using threshold values of the objective indicators.

5. The communication quality evaluation device according to claim 1, wherein the relationship between the plurality of first objective indicators and the use continuation possibility information is expressed by at least one of a distribution of the users who continue use and a distribution of the users who do not continue use.

6. The communication quality evaluation device according to claim 5, wherein the at least one processor is configured to execute the instructions to perform the determination on a basis of a difference in frequencies of the users who continue use and the users who do not continue use, or a ratio of the frequencies.

7. The communication quality evaluation device according to claim 1, wherein the at least one processor is configured to execute the instructions to output a result of the determination of whether the user continues use and information relating to the user.

8. A communication quality evaluation method wherein a communication quality evaluation device comprises a memory, the communication quality evaluation method comprising:
receiving, while a user is using communication service on a portable terminal, use continuation possibility information, which indicates whether the user will continue to use a communication service in the case of each of a plurality of first objective indicators, via a base station from the portable terminal;
receiving a first objective indicator which indicates communication quality from the base station;
storing the received use continuation possibility information and the received first objective indicator into the memory in association with each other;
acquiring a second objective indicator at a point in time at which the communication quality evaluation device makes a determination; and
using the acquired second objective indicator and with reference to permission relationship information, indicating a relationship between the plurality of first objective indicators and the use continuation possibility information, stored in the memory, determining whether the user will continue to use the communication service on a basis of a result of referencing the permission relationship information.

9. A non-transitory computer-readable recording medium storing a communication quality evaluation program that causes a computer of a communication quality evaluation device to execute a process including the steps of:
   receiving, while a user is using a communication service on a portable terminal, use continuation possibility information, which indicates whether the user will continue to use communication service in the case of each of a plurality of first objective indicators, via a base station from the portable terminal;
   receiving a first objective indicator which indicates communication quality from the base station;
   storing the received use continuation possibility information and the received first objective indicator into a memory in association with each other;
   acquiring a second objective indicator at a point in time at which the communication quality evaluation device makes a determination; and
   using the acquired second objective indicator and with reference to the permission relationship information, indicating a relationship between the plurality of first objective indicators and the use continuation possibility information, stored in the memory, determining whether the user will continue to use the communication service on a basis of a result of referencing the permission relationship information.

10. The communication quality evaluation device according to claim 2,
    wherein the at least one processor is configured to execute the instructions to estimate the change in the permission relationship information at the point in time of the determination, when a statistical amount of the plurality of first objective indicators for a period of the point in time of the determination improves with respect to a statistical amount of the plurality of first objective indicators for the predetermined period.

* * * * *